(No Model.) 5 Sheets—Sheet 2.

O. B. PECK.
CENTRIFUGAL ORE SEPARATOR.

No. 479,954. Patented Aug. 2, 1892.

Witnesses:
Chas E Taylor
Clifford J White

Inventor:
Orrin B. Peck,
By Banning & Banning & Payson,
Attys (No Model.) 5 Sheets—Sheet 3.
O. B. PECK.
CENTRIFUGAL ORE SEPARATOR.
No. 479,954. Patented Aug. 2, 1892.
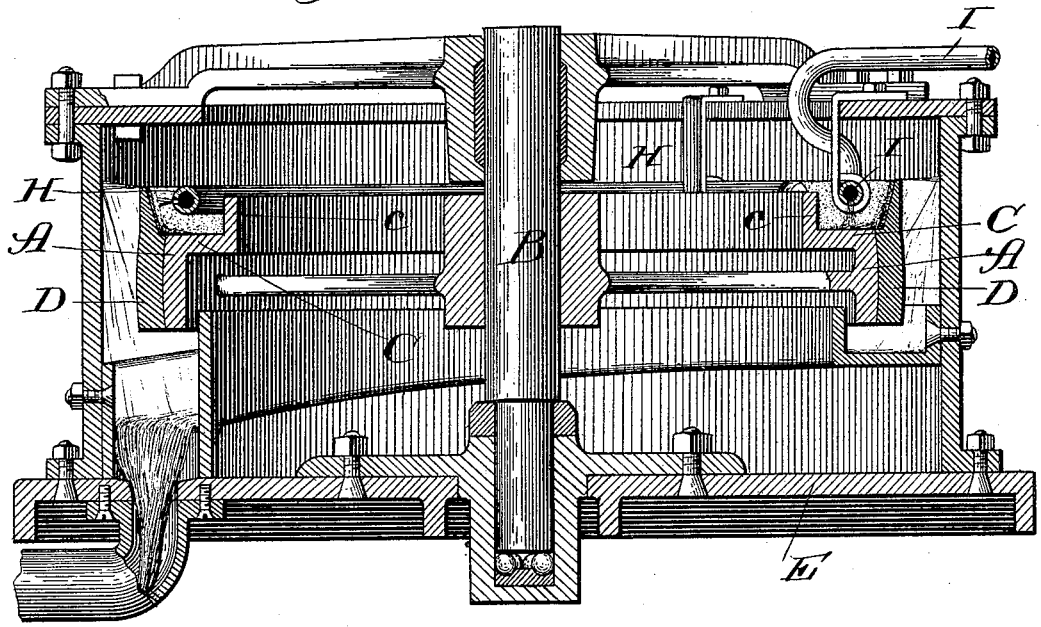
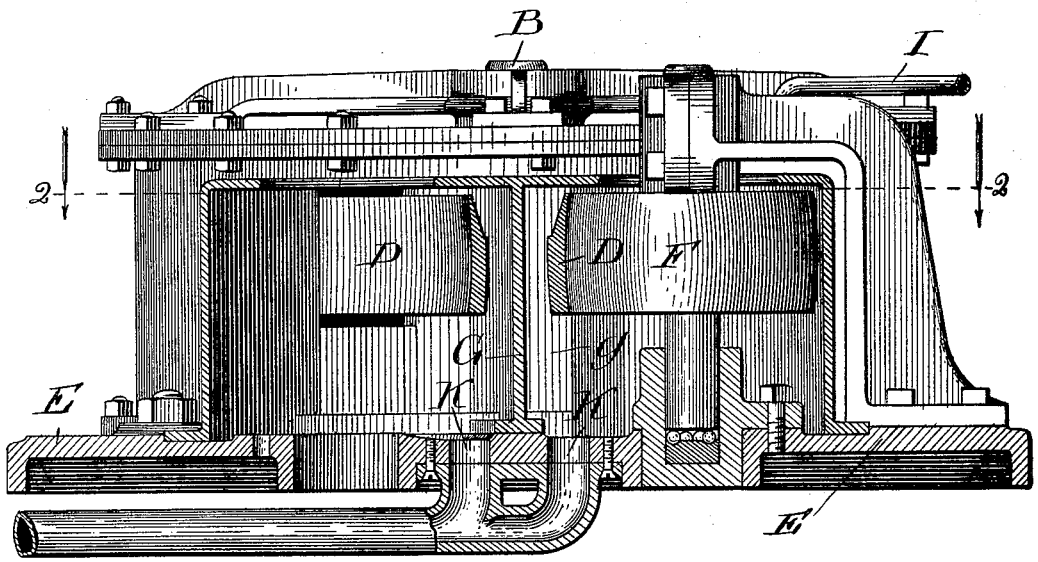
Witnesses:
Chas. E. Gaylord,
Clifford H. White.
Inventor:
Orrin B. Peck,
By Banning & Banning & Payson,
Attys.

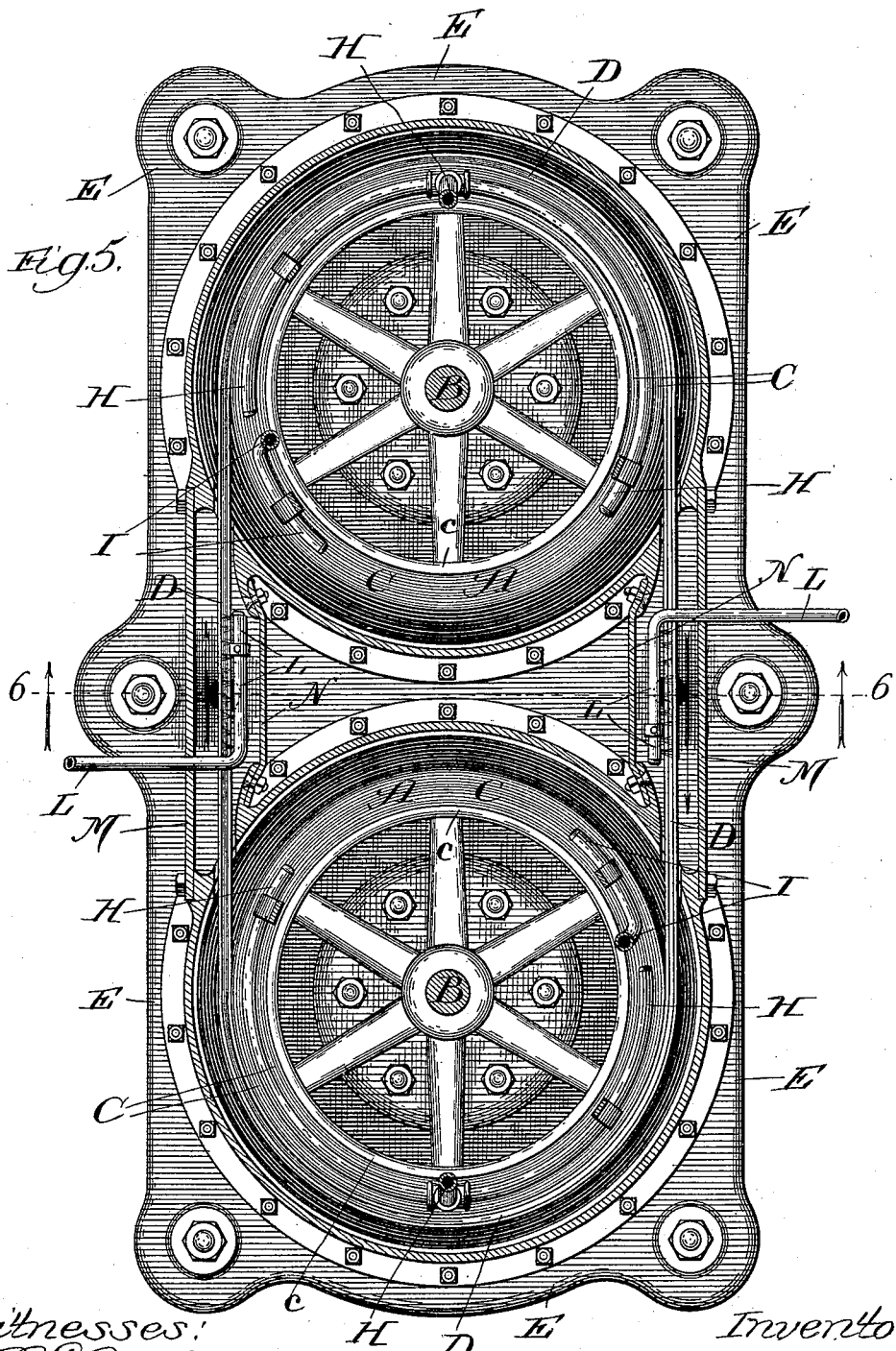

(No Model.) 5 Sheets—Sheet 5.

O. B. PECK.
CENTRIFUGAL ORE SEPARATOR.

No. 479,954. Patented Aug. 2, 1892.

UNITED STATES PATENT OFFICE.

ORRIN B. PECK, OF CHICAGO, ILLINOIS, ASSIGNOR TO MELINDA PECK, OF SAME PLACE.

CENTRIFUGAL ORE-SEPARATOR.

SPECIFICATION forming part of Letters Patent No. 479,954, dated August 2, 1892.

Application filed January 11, 1892. Serial No. 417,684. (No model.)

*To all whom it may concern:*

Be it known that I, ORRIN B. PECK, a citizen of the United States, residing at Chicago, Illinois, have invented certain new and useful Improvements in Centrifugal Ore-Separators, of which the following is a specification.

Figure 1:
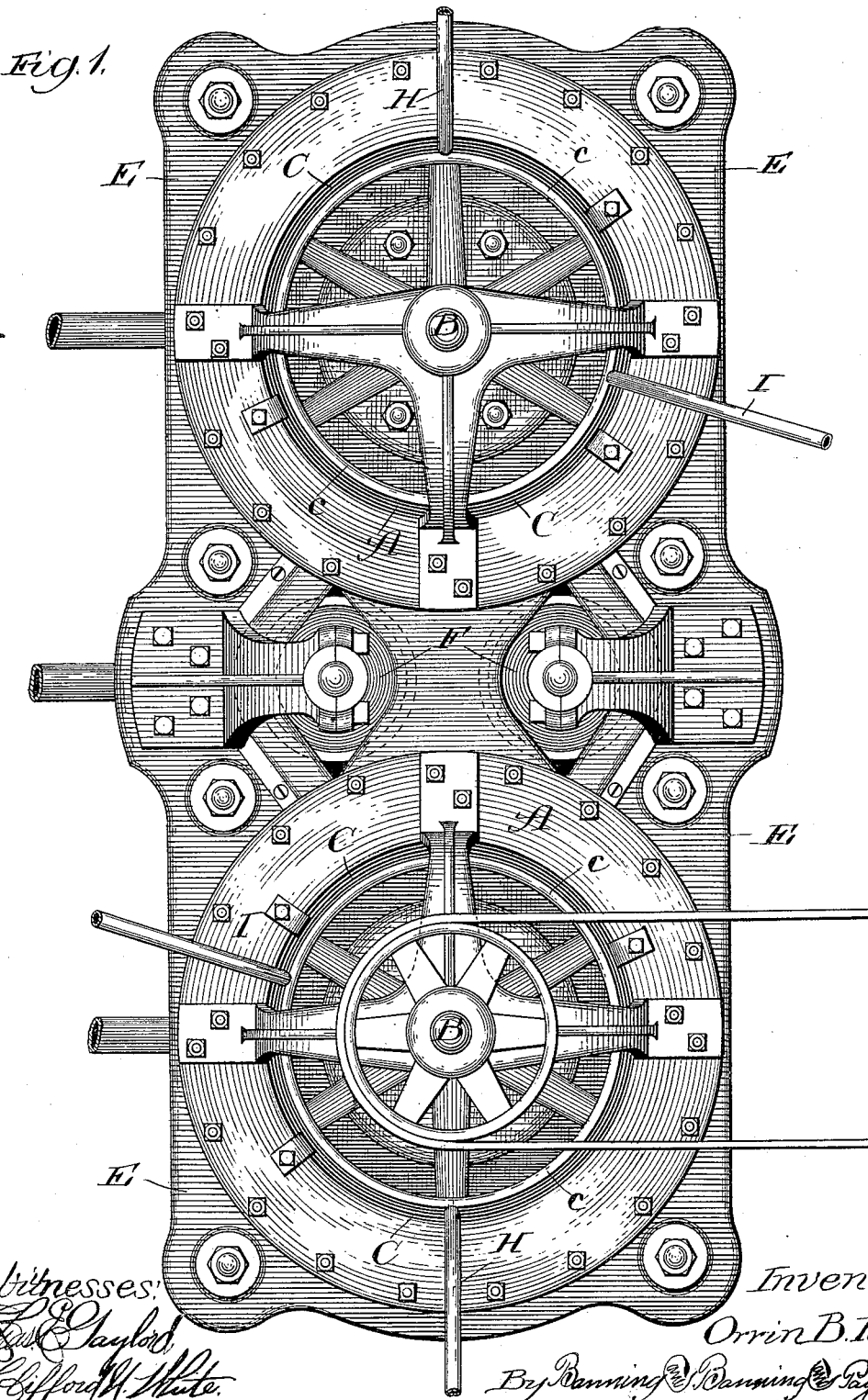
Figure 2:
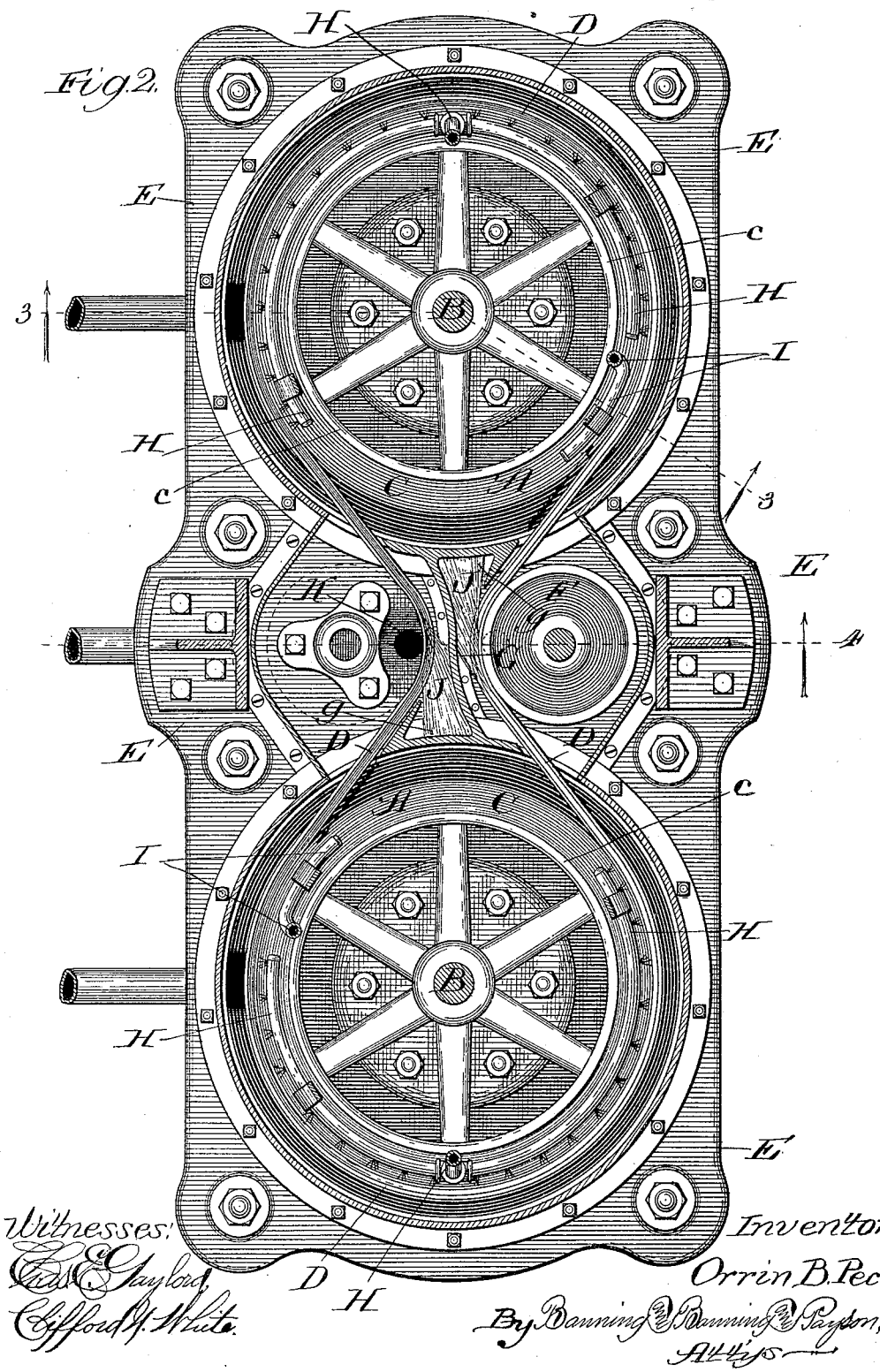
Figure 6:
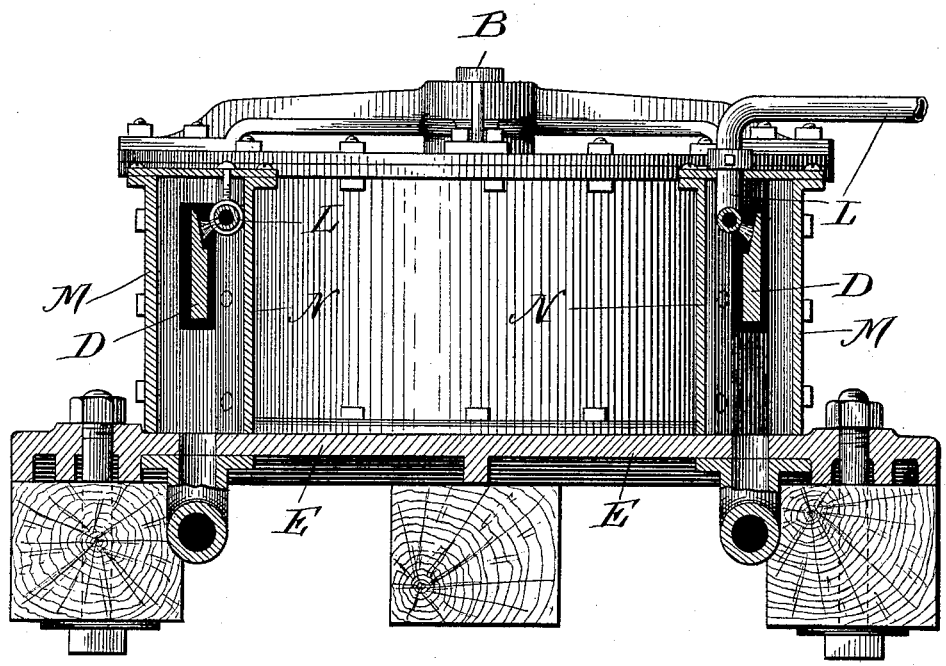
Figure 7:
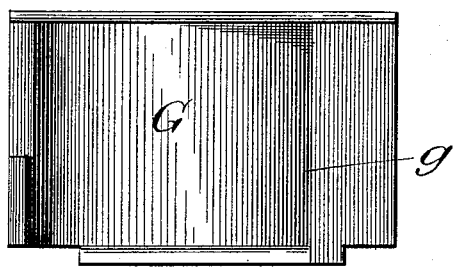

In the drawings, Figure 1 is a plan view of my improved apparatus. Fig. 2 is a plan view of a section taken in the line 2 of Fig. 4, showing one idler removed. Fig. 3 is a vertical section taken in the line 3 of Fig. 2, looking in the direction of the arrows. Fig. 4 is a vertical section taken in the line 4 of Fig. 2, looking in the direction of the arrow. Fig. 5 is a sectional view of a modified form of the apparatus shown in Fig. 2. Fig. 6 is a vertical cross-section taken in the line 6 of Fig. 5, looking in the direction of the arrow; and Fig. 7 is a side elevation of a partition to be hereinafter described and lettered G.

In making my improved apparatus for separating powdered or finely-divided particles containing mineral-bearing substances of different degrees of specific gravity, I make a pulley A, preferably of large diameter, mounted on and revolved by a rotatable shaft B, which may be rotated by a pulley at its top or in any other suitable way. The top of the pulley A is provided with an inwardly-extending flange C, with an upwardly-extending rim c, which is carried up a desired distance. The belt D, made of any suitable material and with its inner upper surface preferably beveled or chamfered to present a separating-surface, preferably inclined, is arranged on the pulley extended far enough above the same to present a sufficient separating-surface. It also makes, between the uprising rim of the pulley and the separating-surface of the belt, an annular channel in which the material to be treated may be deposited. Of course, if desired, the uprising rim c of the pulley may be dispensed with, as the action of centrifugal force would carry the material under treatment outward, and thus render the uprising rim of the pulley unnecessary. I arrange two of these pulleys in near juxtaposition to each other, as shown in Figs. 1 and 2, and preferably mount them both on the same bed-plate E.

Between the pulleys A are preferably arranged idlers F, which bear against the outer surface of the belt between the main pulleys A and bring the sides of the belt close together, so that as the belt passes around the idlers its direction or course is abruptly changed as it spreads out again to encircle the pulleys A.

Between the main pulleys and between the idlers is arranged a partition G, provided with pockets g, as particularly shown in Fig. 2, adapted to catch the material thrown off from the belts while passing around the idlers, as hereinafter described. A water-spraying pipe H is arranged within the separating-surface of the belt and preferably carried around the greater portion of its circumference in each pulley. A material-supplying pipe is arranged to deposit the material to be treated on the receiving surface or flange C of the pulley A at or near the point where the belt first engages with the pulley after leaving the idlers in the course of its travel. The material deposited on the receiving surface or flange of the pulley is carried by the action of centrifugal force against the separating-surface of the belt and up along the same as it travels in its course around the pulley, where it is subjected to the gently-spraying water from the water-pipe H, which assists the action of centrifugal force in driving and throwing off the lighter particles of the material to be treated. The heavier particles adhering to the separating-surface of the belt are carried in its travel to the point where it passes around the idlers and its course abruptly changed, when they are thrown off from the surface of such belt at a tangent by the action of centrifugal force, as shown at J in Fig. 2. The particles thus thrown off are caught in the pockets of the partition G, whence they pass through a hole K to the desired place to be secured. The removal of the heavier particles from the separating-surface of the belt is rendered easy from the fact that as soon as the belt leaves the pulley and ceases to travel in a circle the particles are no longer held against it by the action of centrifugal force. In other words, centrifugal force ceases to be developed and to operate on the particles to cause them to adhere to that portion of the belt which has ceased to travel in a circle, so that the particles may be readily removed. Instead of using idlers, therefore, to cause the particles adhering to the belt to be thrown off from its surface, other means may be employed to remove the particles from the belt. I have shown modified means for this purpose in the last two sheets of the drawings.

In the modified form of apparatus illustrated in these sheets, I have dispensed with the idlers and have carried the belt direct from one pulley to the other, and to detach the heavy particles adhering to the separating-surface of the belt I employ water-pipes L, throwing jets or streams of water with sufficient force against the separating-surface of the belt as it passes from one pulley to the other and where it is running in a straight course. In this way the particles are washed off from the belt at the time they are relieved from the action of centrifugal force and allowed to fall down into pockets or compartments formed on the bed-plate by the partitions M and N, whence they are carried through a hole to the desired place of deposit to secure them.

In application, Serial No. 417,683, filed contemporaneously with this, I have made claims for a process which may be carried out by the apparatus herein described and claimed, and desire, therefore, in this application to claim the apparatus or mechanical improvements described and shown.

What I regard as new, and desire to secure in this specification, is—

1. In centrifugal ore-separators, the combination of rotatable pulleys and a belt provided with a separating-surface and traveling around such pulleys during a portion of its course and at a tangent to a circle in another portion of its course, substantially as described.

2. In centrifugal ore-separators, the combination of rotatable pulleys and a belt provided with a separating-surface and traveling around such pulleys in a circle during a portion of its course and at a tangent to a circle in another portion of its course, substantially as described.

3. In centrifugal ore-separators, the combination of rotatable pulleys, a belt provided with a separating-surface and traveling around such pulley during a portion of its course and at a tangent to a circle in another portion of its course, a material-supply pipe depositing material to be carried against the separating-surface of the belt at or near the point where it enters its circular course around the pulleys, and a water-pipe spraying water against the separating-surface of the belt while passing in its circular course, substantially as described.

4. In centrifugal ore-separators, the combination of rotatable pulleys, a belt provided with a separating-surface and traveling around such pulleys during a portion of its course and at a tangent to a circle in another portion of its course, a material-supply pipe depositing the material to be carried against the separating-surface of the belt at or near the point where it enters its circular course around the pulleys, a water-pipe spraying water against the separating-surface of the belt while passing in its circular course, and means for detaching the particles adhering to the belt while passing through the tangential portion of its course, substantially as described.

5. In centrifugal ore-separators, the combination of rotatable pulleys, a belt provided with a separating-surface and traveling around such pulleys during a portion of its course and at a tangent to a circle in another portion of its course, and idlers abruptly changing the course of the belt from a tangential to a circular course to cause particles adhering to its separating-surface to be discharged, substantially as described.

6. In centrifugal ore-separators, a belt provided with a separating-surface, traveling a portion of its course in a circular direction, means for causing such travel of the belt, and means for supplying the separating-surface of the belt with the material to be separated, substantially as described.

ORRIN B. PECK.

Witnesses:
THOMAS A. BANNING,
MARIE L. PRICE.